(12) United States Patent
Smirnov et al.

(10) Patent No.: US 9,256,228 B2
(45) Date of Patent: Feb. 9, 2016

(54) MASS FLOW CONTROLLER WITH ONBOARD DIAGNOSTICS, PROGNOSTICS, AND DATA LOGGING

(75) Inventors: Alexei V. Smirnov, Fort Collins, CO (US); Patrick Albright, Wellington, CO (US); Cy Jordan, Fort Collins, CO (US); Arun Nagarajan, San Bruno, CA (US); Michael J. Zolock, Berthoud, CO (US); Ryan Johnson, Fort Collins, CO (US); Alexander Fernandez, San Francisco, CA (US)

(73) Assignee: Hitachi Metals, Ltd., Tokyo (JP)

( * ) Notice: Subject to any disclaimer, the term of this patent is extended or adjusted under 35 U.S.C. 154(b) by 668 days.

(21) Appl. No.: 13/354,631

(22) Filed: Jan. 20, 2012

(65) Prior Publication Data

US 2012/0186655 A1 Jul. 26, 2012

Related U.S. Application Data

(60) Provisional application No. 61/434,766, filed on Jan. 20, 2011.

(51) Int. Cl.
*G06F 11/34* (2006.01)
*G05D 7/06* (2006.01)

(52) U.S. Cl.
CPC .......... *G05D 7/0635* (2013.01); *Y10T 137/0318* (2015.04); *Y10T 137/7759* (2015.04)

(58) Field of Classification Search
CPC ....... G05D 7/0635; G01F 5/00; G01F 1/6847; G01F 1/6842; G01F 1/696; G01F 15/005; G01F 25/0053; G05B 11/42; G05B 13/024
USPC .................. 702/183, 185; 137/468
See application file for complete search history.

(56) References Cited

U.S. PATENT DOCUMENTS 5,062,446 A * 11/1991 Anderson .............. 137/468
2003/0234045 A1* 12/2003 Shajii et al. .............. 137/487.5
(Continued)

FOREIGN PATENT DOCUMENTS

| JP | H07-210243 | 8/1995 |
| JP | H08-138180 | 5/1996 |
| JP | 2009-251874 | 10/2009 |

OTHER PUBLICATIONS

Rabbani, Firoozeh, "International Search Report and Written Opinion re application No. PCT/US2012/022057", Mar. 14, 2012, Published in: AU.

(Continued)

*Primary Examiner* — Lam Nguyen
(74) *Attorney, Agent, or Firm* — Neugeboren O'Dowd PC

(57) ABSTRACT

A mass flow controller and method for operating the same is disclosed. The mass flow controller includes a mass flow control system to control the mass flow rate of a fluid, and a data logging component that obtains snapshots of condition-specific-data for each of a plurality of reoccurring condition types, and reduces each snapshot of condition-specific-data to functional parameter values that characterize each snapshot of condition-specific-data, and the data logging component generates statistical values that are stored in a short term data store that characterize multiple functional parameter values that are obtained during each separate occurrence of a specific condition type. A diagnostics component diagnoses failures using current functional parameter values and the statistical values stored in the short-term memory, and a prognostics component predicts failures based upon a collection of data sets that are stored in the long-term memory.

12 Claims, 8 Drawing Sheets

(56) References Cited

U.S. PATENT DOCUMENTS

| | | | |
|---|---|---|---|
| 2005/0006344 A1* | 1/2005 | Tanaka | 216/59 |
| 2005/0055177 A1* | 3/2005 | Malik et al. | 702/183 |
| 2008/0009978 A1* | 1/2008 | Smirnov | 700/282 |
| 2008/0294382 A1* | 11/2008 | Lim et al. | 702/185 |
| 2010/0000608 A1 | 1/2010 | Goto et al. | |
| 2010/0076729 A1* | 3/2010 | Davis et al. | 702/184 |
| 2011/0307104 A1* | 12/2011 | Smirnov | 700/282 |

OTHER PUBLICATIONS

Mohri, Mineko, "International Report on Patentability re Application No. PCT/US2012/022057", Aug. 1, 2013, p. 8 Published in: CH.

Japanese Patent Office, "Office Action re Japanese Patent Application No. 2013-550623", Dec. 15, 2015, p. 6 Publisher: Japanese Patent Office, Published in: JP.

* cited by examiner

| Name | | Value | Comment |
|---|---|---|---|
| param ID | | 5 | delay |
| start time | | 12/20/2011 16:16 | |
| samples | | 38 | |
| temperature | | 28 | |
| set point bin | | 8 | 30%...55% |
| pressure bin | | 3 | 25psi...35psi |
| data | mean | 93.5 | |
| | SD | 2.4 | |
| | min | 86.1 | |
| | max | 98.3 | |

MASS FLOW CONTROLLER WITH ONBOARD DIAGNOSTICS, PROGNOSTICS, AND DATA LOGGING

FIELD OF THE INVENTION

The present invention relates to control systems, and in particular, but not by way of limitation, the present invention relates to systems and methods for managing and maintaining mass flow controllers.

BACKGROUND OF THE INVENTION

For many manufacturing processes (e.g., thin film deposition processes), it is very important that the mass flow rates of process fluids that are fed into a process chamber be precisely controlled. But many issues arise during ongoing operation of mass flow controllers those adversely affect the ability of mass flow controllers to accurately control mass flow rates.

From the perspective of the user/operator, the particular issues that arise are often not readily apparent or are unexpected, which leads to a high cost of ownership due to unscheduled maintenance. For example, the issues (e.g., minor operating inaccuracies to complete failures) may occur without any immediate indication as to what caused the specific type of undesirable operation. Moreover, users often lack the training, tools, and/or desire to diagnose issues; thus users of mass flow controllers may simply replace mass flow controllers when an issue arises. As a consequence, mass flow controllers are often replaced when information about the underlying problem could lead to a simple remedy. In addition to being an expensive maintenance approach from the user's perspective, the replacement/return of mass flow controllers is also an expensive approach from a vendor's perspective because mass flow controllers may be returned to the vendor that appear to operate normally when tested by the vendor.

If mass flow controllers are not replaced when issues arise, that lack of on-board diagnostic information on mass flow controllers may necessitate that high-cost field service or application engineers visit the user's location to provide on-site tech support and failure analysis once an MFC has been installed. Accordingly, a need exists for a mass flow controller with new and innovative features that enables simpler and more cost effective diagnostic and prognostic analysis.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some aspects of the invention may be characterized as a method for managing operation of a mass flow controller. The method may include receiving data that includes information about operating conditions of the mass flow controller and control loop variables, and monitoring the received data for a change in an operating condition of the mass flow controller. In addition, when the change in operation is detected, N samples of condition-specific-data that are selected from the received data is recorded to obtain a snapshot of operating characteristics of the mass flow controller when the condition occurs. And based upon the samples of the condition-specific-data, a functional parameter value is determined for each of a plurality of event-specific functional parameters that are relevant to the condition. A plurality of data sets are then created in short term memory a first time a particular type of condition is detected, each of the plurality of data sets includes fields for statistical values for a corresponding one of change-specific functional parameters that are associated with the particular condition. And each time the particular type of condition is detected, and until a predefined event occurs, the statistical values are updated in each of the data sets that correspond to the condition-specific functional parameters that are associated with the particular type of condition. Based upon current values of the condition-specific functional parameters and the statistical values in the data sets in short term memory, diagnostic actions are performed.

Other aspects of the invention may be characterized as a mass flow controller that includes a mass flow control system that includes a mass flow sensor to provide an indication of a mass flow rate of a fluid through the mass flow controller, a control valve to regulate a flow of the fluid, and a control component to control a position of the control valve responsive to a set point and the indication of the mass flow rate of the fluid. The mass flow controller also includes a short-term data store and a data logging component that obtains snapshots of condition-specific-data for each of a plurality of reoccurring condition types, and reduces each snapshot of condition-specific-data to functional parameter values that characterize each snapshot of condition-specific-data, and the data logging component generates statistical values that are stored in the short-term data store that characterize multiple functional parameter values that are obtained during each separate occurrence of a specific condition type. And a diagnostics component of the mass flow controller diagnoses failures using current functional parameter values and the statistical values stored in the short-term data store.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

Figure 1:
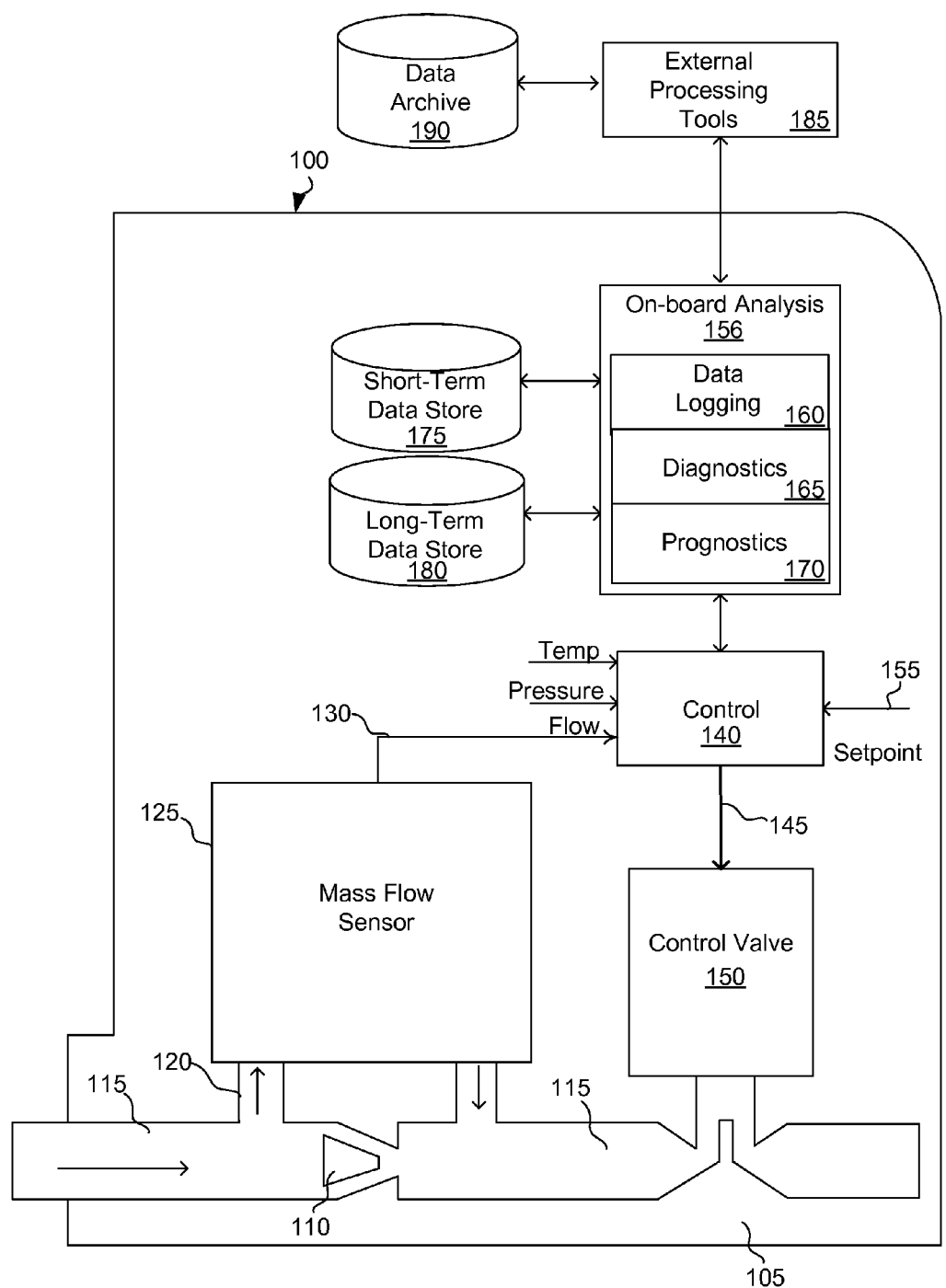
FIG. 1 is a block diagram that illustrates an exemplary mass flow controller according to an embodiment of the invention.

According to several embodiments, an inventive mass flow controller (MFC) is disclosed. While controlling fluid flow, an inventive on-board data logging and diagnostic system on the MFC may gather a lot of information about operation of the MFC (e.g., set point, flow, valve position, transient delay, transient overshoot, etc.). This information, in several variations of the MFC, is filtered (e.g., selected), saved into the MFC internal memory (logged), processed and analyzed internally in the MFC, as well as downloaded from the MFC to the external computer.

Based on that information, the MFC can automatically adjust its operational parameters to improve performance "on-the-fly," detect current failures, predict possible future failures, notify operator about current and predicted events, and provide valuable information for application and MFC engineers for further analysis and possible tool process adjustment and MFC design improvement.

An advantage of the on-board diagnostic and data logging system is that it can use internal "low-level" data and information which is not accessible by users because the end users cannot obtain very detailed information (the data snapshots) due to limitation of the data transferring bandwidth, processing power, and storage capabilities of the tool. As discussed further herein, the "low-level" data and information may be measured (e.g., raw) sensor data and "computed" (e.g., intermediate) control loop variables. In addition, customers do not need such "low-level" information for monitoring the tool and running tool warning/alarm system.

As discussed further herein, the MFC can monitor internal signals and functional parameters during the tool idle cycle and during the process. Processing power of the MFC allows obtaining, processing, storing, and analyzing significant amount of the data during normal operation, without affecting the functionality and performance of the MFC. It is important to note that MFC need not monitor nor log tool process specific information, such as set points/pressure/duration of process steps: the data logging and analysis discussed herein are typically irrelative to the process.

Beneficially, firmware (on-board control software) of embodiments of the inventive MFC disclosed herein has access to all measured data continuously coming from various MFC sensors, and all "computed" (intermediate) control loop variables that are used by the control system of the MFC. As a consequence, embodiments of the MFC are able to:

- record relatively large snapshots of data (measured and computed) in short-term memory;
- process the data snapshots in real time to extract valuable information in the form of "functional parameters;"
- perform preliminary analysis of the functional parameter values to detect existing or possible failures and alert customers;
- store a representation (e.g., a statistical representation) of the functional parameters into long-term memory as "data sets," and use the data sets to detect trends of critical parameters and predict failures; and
- provide information from the data sets in long-term memory for further use by engineering and troubleshooting.

As discussed further herein, there are two types of data that are measured/calculated, stored in the memory of the MFC, and then used for diagnostics/troubleshooting: raw sensor data and functional parameters. The raw sensor data can be obtained during idle cycles of the tool, as well as during a process (e.g., thin-film deposition process). Raw sensor data is "low-level" data that is used to confirm basic functionality of the MFC, but typically the raw sensor data is not used to guarantee MFC performance. Instead functional parameters characterize MFC performance at specific operating conditions such as flow set point, pressure, etc. Functional parameters are used to confirm MFC performance and its compliance to specifications.

Referring now to the drawings, FIG. 1 illustrates a mass flow controller (MFC) 100 that uses on-board data logging and analysis to better manage operation and maintenance of the MFC 100. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, firmware, software, or any combination thereof. Moreover, in light of this specification, the construction of each individual component is well known within the skill of those of ordinary skill in the art.

In some embodiments, the fluid controlled by the MFC 100 is a liquid (e.g., sulfuric acid) and in other embodiments a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver the fluid to a tool in a semiconductor facility, and may be configured to deliver the fluid under high pressure, low temperature, or to different types of containers or vessels.

As depicted, in the present embodiment a base 105 of MFC 100 includes bypass 110 through which a gas flows. The bypass 110 directs a constant proportion of gas through main path 115 and sensor tube 120. As a consequence, the flow rate of the fluid (e.g., gas or liquid) through the sensor tube 120 is indicative of the flow rate of the fluid flowing through the main path of the MFC 100.

In this embodiment, the sensor tube 120 is a small bore tube that is part of a thermal mass flow sensor 125 of the MFC 100. In general, the thermal mass flow sensor 125 is configured to provide an output signal 130, which is a digital signal that is indicative of the flow rate through the sensor tube 120, and hence, indicative of the flow rate through the main path 115 of the MFC 100. As one of ordinary skill in the art will readily appreciate, a variety of different technologies including bridge-disposed resistance-thermometer elements (e.g., coils of conductive wire), resistance temperature detectors (RTD), and thermocouples in connection with analog, analog-to-digital, and digital processing technologies may be used realize the thermal mass flow sensor 125. One of ordinary skill in the art will also recognize that the output signal 130 may be adjusted (e.g., by adjusting the signal 130 with predetermined calibration coefficients) based upon physical characteristics of the MFC 100 and/or characteristics of the fluid (e.g., gas) flowing through the MFC 100.

The control component 140 along with the thermal mass flow sensor 125 in this embodiment are part of a control system that operates to generate a control signal 145 to control a position of the control valve 150 based upon the output signal 130 in order to provide a flow rate that is indicated by a set point signal 155. The control valve 150 may be realized by a piezoelectric valve or solenoid valve, and the control signal 145 may be a voltage (in the case of a piezoelectric valve) or current (in the case of a solenoid valve). As shown, the control component 140 also utilizes temperature and pressure inputs to more accurately control the flow rate. Both pressure and temperature sensors and corresponding implementations in the context of mass flow controllers are well known to those of ordinary skill in the art, and as a consequence, details of temperature and pressure sensor systems are not included herein.

As shown in FIG. 1, the exemplary MFC 100 also includes an on-board analysis component 156 that includes a data-logging component 160, a diagnostics component 165, and a prognostics component 170. In addition, a short-term data store 175 and long-term data store 180 are coupled to the on-board analysis component 156 in addition to external processing tools 185 that utilize a data archive 190.

In general, the on-board analysis component 156 operates to improve performance of the MFC 100 "on-the-fly," detect current failures, predict possible future failures, notify an operator about current and predicted events, and provide valuable information for application and MFC engineers for further analysis and possible tool process adjustment and MFC design improvement.

The data-logging component 160 operates, at least in part, to collect snapshots of data about operating conditions of the mass flow controller and control loop variables when conditions of interest occur; condense the large number of samples in the snapshot to functional parameter values that generally characterize the snapshots of data; and further condense the functional parameter values into datasets of statistical values that are stored in the short-term data store 175. And the diagnostics component 165 accesses the data sets in the short-term data store 175 to provide diagnostic functions as discussed further herein. In addition, the data sets of statistical values are periodically stored in the long-term data store 180 (or stored in the long term data store in response to one or more events) and used by the prognostics component 170 as discussed further herein. In addition, collections of data sets may be archived off of the MFC 100 in the data archive 190 for analysis by external processing tools 185 that may be realized by one or more computers that are specifically programmed to analyze the data in the data archive 190. For example, to perform a more detailed analysis of the logged data, the data can be transferred to the external processing tools 185 and processed with more efficient and sophisticated software tools. This feature can be used by MFC engineers for troubleshooting and further product development.

The users (e.g., application engineers) of the MFC 100 may use logging information to adjust MFC calibration/tuning parameters in order to optimize and improve MFC performance on the tool (in-situ). For example, the tool control software may read statistical data of "transient delay" and "overshoot" functional parameters, and based on their values adjust set point timing of the tool to provide optimal waveform of flow transient.

Figure 2:
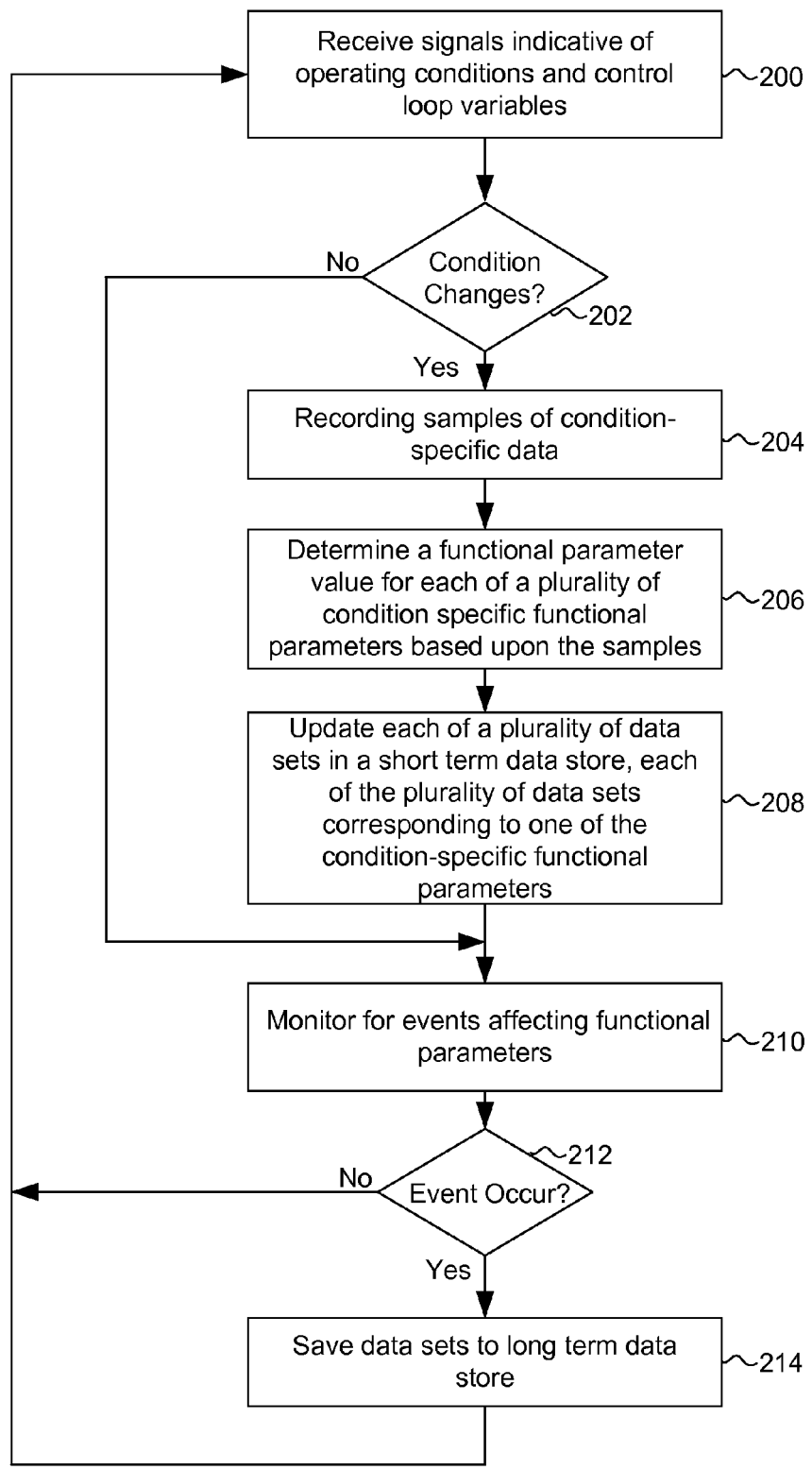
FIG. 2 is a flowchart depicting an exemplary method that may be carried out in connection with the mass flow controller depicted in FIG. 1.

Referring to FIG. 2, it is a flowchart that depicts a method for logging data that may be carried out by the data-logging component 160. As shown, the data-logging component 160 receives signals that are indicative of operating conditions and control loop variables (Block 200). The operating conditions include flow and pressure conditions, and the control loop variables include values of variables that may be calculated. With respect to the flow and pressure conditions, the output signal 130 of the thermal mass flow controller 125 may be used to obtain flow conditions, and pressure conditions may be obtained from the pressure signal received at the controller, which may be derived from a pressure sensor (not shown) located upstream from the sensor tube 120 in the main path 115.

Figure 3:
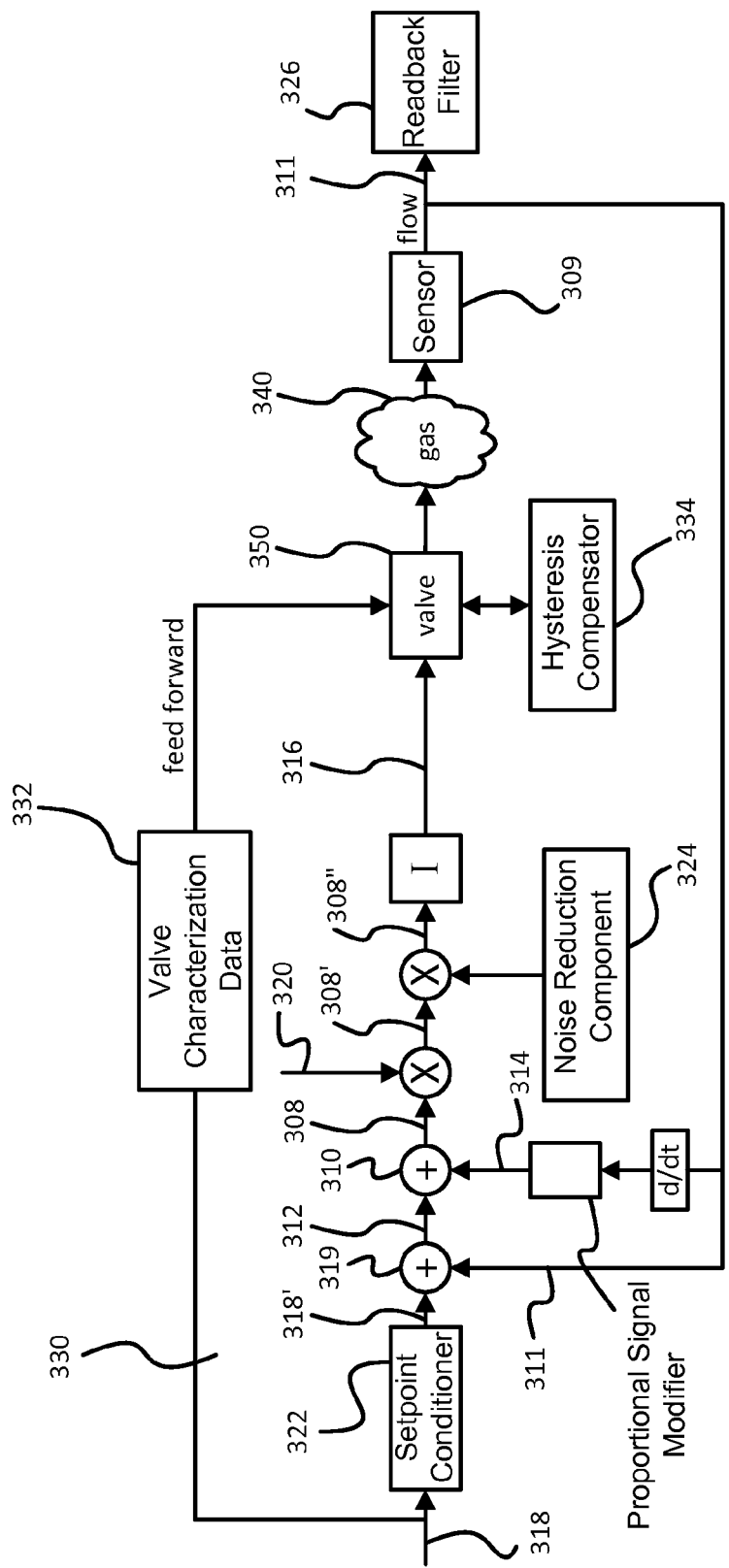
FIG. 3 is a block diagram depicting components of an exemplary control loop that may be implemented within the mass flow controller depicted in FIG. 1.

The control loop variables are calculated values that characterize aspects of the control system of the MFC 100. Referring briefly to FIG. 3, shown are portions of a control loop of the MFC 100 where one or more control loop variable values are obtained. It should be recognized that the components depicted in FIG. 3 are merely exemplary and certainly not required—the inventive aspects disclosed herein are not limited to any particular control scheme or control loop architecture. As shown in FIG. 3, the control loop components include a variable gain input 320, a setpoint conditioner 322, a noise reduction component 324, and a readback filter 326. The variable gain input 320 may supply a variable gain to the control loop so that the MFC 100 provides a stable input to the valve 350. The variable gain input 320 therefore may allow for a more stable integral signal 316 across multiple flow conditions such as, but not limited to, multiple pressure values. In one location the noise reduction filter 324 may receive the combination signal 308' after the variable gain is implemented in order to slow down loop processing so that any noise in the combination signal 308" output by the noise reduction filter 324 is reduced, thereby creating a more accurate adjustment of the valve 350. The setpoint conditioner 322 is adapted to modify the setpoint signal 318, and the modified setpoint signal 318' may be received by the first adder 319 in one embodiment. In FIG. 3, the setpoint conditioner 322 may modify the signal 318' so that the setpoint signal 318' may be properly processed. The first adder 319 may output an error signal 312 to a second adder 310, which may also receive the proportional signal 314 and output the combination signal 308.

Also depicted in FIG. 3 is a feed-forward control signal 330. The feed-forward control signal 330 is adapted to provide a control signal substantially directly to the valve 350 from the setpoint signal 318. The feed-forward control signal 330 is provided in some applications when a quicker valve response to a flow rate change is desired than what is typically provided with the integral signal 316. In one embodiment, the feed-forward control signal 330 may comprise valve characterization data 332. The valve characterization data 332 may modify the feed-forward control signal 330, taking into account setpoint, pressure, fluid type, and other parameters. One embodiment may also comprise a hysteresis compensator 334 adapted to compensate for effects of hysteresis in the valve 313. The feed-forward control signal 330 and hysteresis compensator 334 may be similar to the feed-forward control signal 330 and compensator 334 found in U.S. patent application Ser. No. 12/356,661, entitled Mass Flow Controller Hysteresis compensation System & Method, which is incorporated by reference in its entirety. Upon receiving the integral signal 316 or the feed-forward control signal 330, the valve 350 is adapted to adjust the flow rate of the fluid 340. The sensor 309, in turn, measures the actual flow rate of the fluid 340 and outputs the measured flow rate signal 311.

One or more of the following control loop variables of this exemplary control loop may be received (and logged when an condition of interest occurs as discussed below): the modified set point signal 318', the first error ("combination") signal 308, the variable gain control signal 320, the second error ("combination") signal 308', the noise reduction control signal 324, the third error ("combination") signal 308", the valve control signal 316, the measured flow rate signal 311.

Referring again to FIG. 2, when there is a change to one or more operating conditions (Block 202), samples of condition-specific data are recorded to obtain a snapshot of operating characteristics and the control loop variables of the mass flow controller when there is a condition change (Block 204). The data snapshot may include 1000 samples of each data parameter taken with maximum allowed sampling rate, e.g., at every control loop cycle (for example, with 3 ms interval). But this is certainly not required, and other sample rates may be utilized.

The condition changes that may trigger the recordation of the samples may include a change in a flow set point and a change in the pressure of the fluid that the MFC 100 is controlling. It is also contemplated that other conditions such as a valve position change; a "zero offset" procedure being performed; or a time lapse may also trigger the recording of the condition-specific data.

Figure 4A:
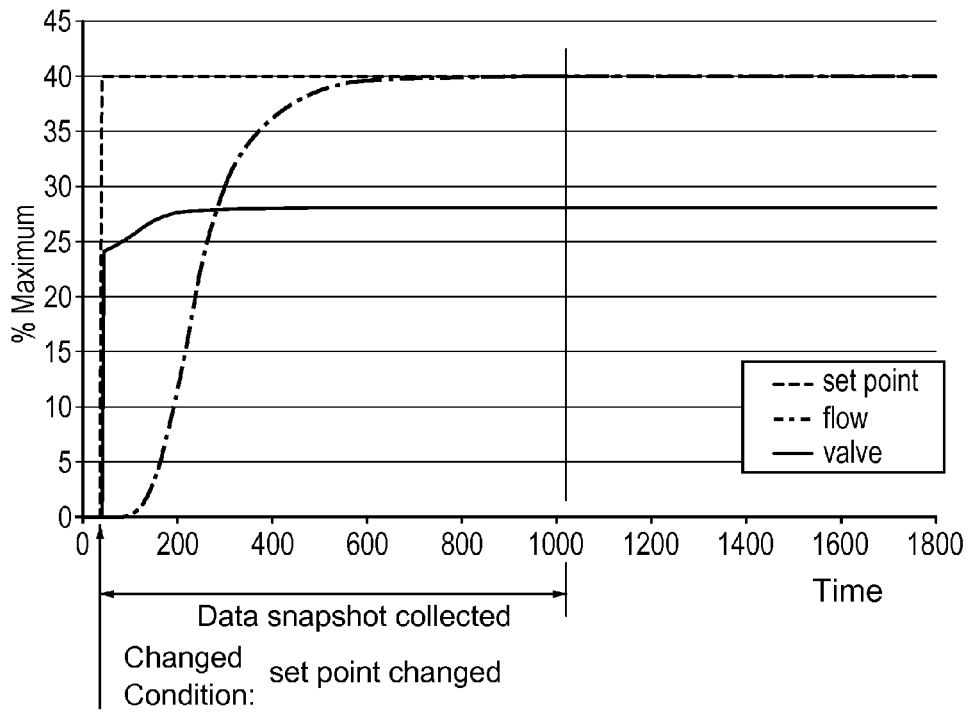
FIG. 4A is a graph that shows an exemplary data snapshot period in response to a set point change to the mass flow controller depicted in FIG. 1.
Figure 4B:
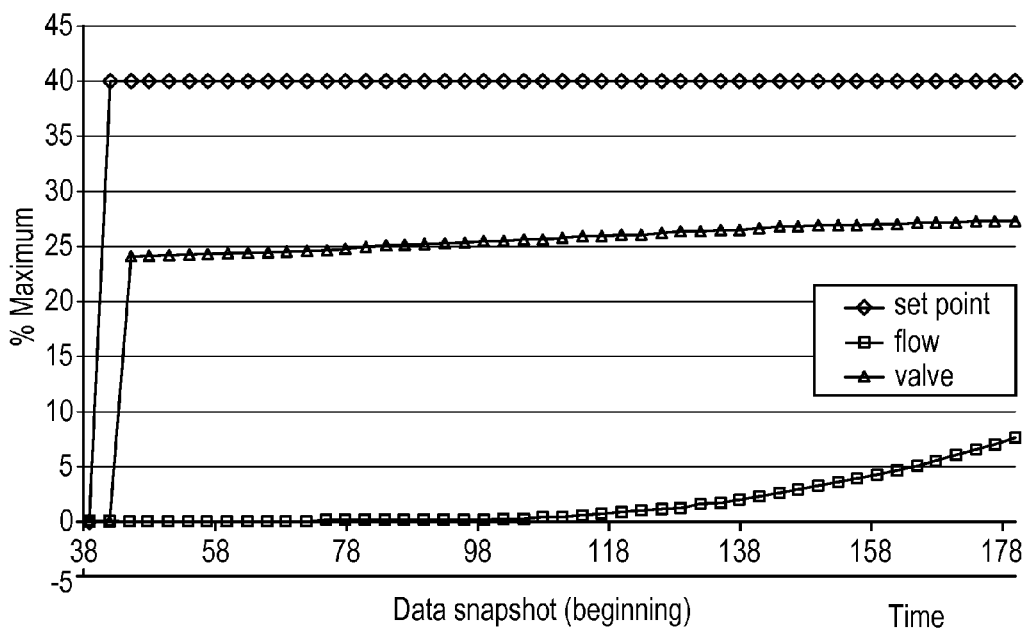
FIG. 4B is a graph that depicts samples taken during an initial portion of the snapshot that is depicted in FIG. 4A.

Referring to FIG. 4A, for example, shown are an exemplary flow profile and detected-condition that triggers the recording of samples, and FIG. 4B depicts at least a portion of the operating conditions that are sampled. In the example depicted in FIG. 4A, a set point change from a zero value to a non-zero value triggers the recordation of the data snapshot, and FIG. 4B depicts the samples taken of the set point, flow, and valve position during an initial portion of the snapshot that is depicted in FIG. 4A.

The set of recorded data parameters can be different depending upon the type of condition change that is detected at Block 202. For most condition changes, the following data parameters are being recorded: measured flow; pressure; and valve position. But for some other types of condition changes, other condition-specific data parameters can be recorded. For example, it is contemplated that values of the following parameters may be recorded: flow set point; parasitic flow; corrected flow sensor signal; control loop gain; control loop time constant; flow indicator (readback) signal; and flow indicator time constant.

As shown in FIG. 2, after the samples are recorded (Block 204), a functional parameter value is determined for each of a plurality of condition-specific functional parameters based upon the samples (Block 206). Each of the functional parameters succinctly characterizes a different aspect of the multi-sample snapshot; thus a single functional parameter value succinctly provides relevant information about the operation of the MFC 100 during the snapshot, and each of the functional parameters are condition-specific because the particular functional parameters may vary depending upon the particular conditions that change.

Figures 4C, 4D:
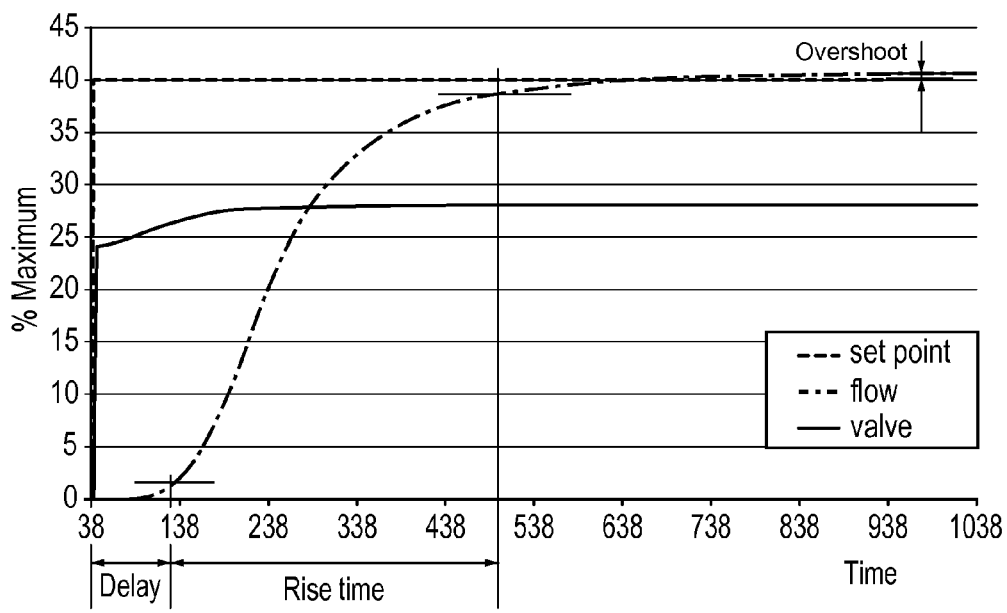
FIG. 4C is a graph that shows functional parameter values corresponding to the data snapshot depicted in FIGS. 4A and 4B.
FIG. 4D depicts an exemplary data set for a particular functional parameter.

As shown in FIG. 4C for example, the set point change depicted in FIG. 4A from zero to the non-zero value may have the following functional parameters associated with it: transient delay, transient rise time, overshoot at steady flow. And although not shown in FIG. 4C, valve start position, control time, and valve shift may also be functional parameters associated with the set point change from zero to the non-zero value. The term "valve shift" refers to a difference between the actual valve position and a calibrated valve position at a specific flow set point and pressure. The valve shift value is used for an adaptive valve start position calculation, which is described in detail U.S. patent application Ser. No. 13/206, 022, entitled "Mass Flow Controller Algorithm with Adaptive Valve Start Position," which is incorporated herein by reference in its entirety.

A set point change from a non-zero value to another non-zero value may have the following functional parameters associated with it: transient delay; transient rise/fall time; overshoot; control time; valve shift at steady flow. And a set point change from non-zero value to a zero value may have the following functional parameters associated with it: transient delay; transient fall time; overshoot; control time; and zero offset (steady flow).

In addition to a set point change, a pressure change may also trigger the recording of a data snapshot. And a pressure change at a non-zero flow may have the following functional parameters associated with it: pressure change; ratio of valve position change to pressure change; maximum flow error; flow error at the moment of switching to closed-loop control mode; and duration of the open-loop control mode. A pressure change that occurs during a period of zero flow may have pressure change and maximum flow error as functional parameters.

As shown in FIG. 2, once functional parameter values are determined based upon the data snapshot (Block 208), each of a plurality of data sets is updated in the short-term data store 175. Applicants have found that storing all the functional parameter values in the short and long term data stores 175, 180 utilizes too much of the memory that is available on the MFC, and Applicants have also found that storing all the functional parameter values is unnecessary to provide the diagnostic and prognostic capabilities described herein. More specifically, Applicants have found that the parameter values do not typically change fast enough to require retention of all the parameters values every time conditions change.

As a consequence, in several embodiments each of the data sets includes statistical characteristics of the functional parameter values instead of their raw values. More specifically, the updating of the short term data store 175 in these embodiments includes updating statistical data that characterizes the parameter values, which as discussed further herein, are obtained at similar set point and pressure conditions (e.g., close to the specific calibration conditions) during stable operating temperatures so that the statistical data of the parameters obtained at similar temperatures is combined.

As shown in FIG. 4D, each data set may include the following information: functional parameter ("type" or "ID"), start time of the data set, number of functional parameter value samples used for the statistics, averaged temperature, set point range (e.g., one of ten ranges), pressure range (e.g., one of six ranges), and statistical data for the parameter. The statistical data may include mean (averaged) value, standard deviation, minimum value, and maximum value. In some variations, to save memory space, one "peak-to-peak" value can be stored instead of separate minimum and maximum values.

Although not required, Applicants have found that the number of different data sets that are retained in the short-term data store 175 and the long-term data store 180 may be reduced by associating each data set with a range of operating conditions. More specifically, ranges of both the set point and pressure at the moment the condition that triggers recording of data occurs at Block 204 may be established to reduce a number of data sets that are stored.

The particular ranges of the set points and pressures may be determined by the calibration set points and pressures that are utilized during calibration of the MFC 100. For example, if calibration was carried out at 10 flow set points and 6 pressures, there may be 10 set point ranges (bins) and 6 pressure ranges (bins) to combine statistical data.

For example, if calibration set points were 0.3%, 0.5%, 1%, 2%, 5%, 10%, 20%, 40%, 70%, 100%, then the set point ranges may be organized as shown in Table 1.

TABLE 1

| Bin | Set Point Range |
| --- | --- |
| #1 | 0.1% to .4% |
| #2 | 0.4% to 0.75% |
| #3 | 0.75% to 1.5% |
| #4 | 1.5% to 3.5% |
| #5 | 3.5% to 7.5% |
| #6 | 7.5% to 15% |
| #7 | 15% to 30% |
| #8 | 30% to 55% |
| #9 | 55% to 85% |
| #10 | 85% to 100% |

Within each of these ranges, the response of the MFC 100 is expected to be substantially the same.

And if calibration pressures are 15 psi, 20 psi, 30 psi, 40 psi, 50 psi, and 65 psi, the pressure ranges may be established as follows in Table 2.

TABLE 2

| Bin | Pressure Range |
| --- | --- |
| #1 | 0 psi to 17.5psi |
| #2 | 17.5 psi to 25psi |
| #3 | 25 psi to 35 psi |
| #4 | 35 psi to 45 psi |
| #5 | 45 psi to 57.5 psi |
| #6 | >57.5 psi |

With respect to set point ranges, any set point change from one bin to another bin may be characterized as a condition change at Block 202 that results in a corresponding data set (if a data set has not yet been generated) or an updated data set at Block 208 if a data set has been created. As a consequence, there are 110 different transitions (90 for transitions between nonzero set point bins; 10 for transitions from a zero set point to a nonzero set point bin; and 10 from a nonzero set point bin to the zero set point), so there are potentially 110 different condition changes due to set point changes alone. But each set point change may also occur in connection with one of the 6 pressure ranges, so there may be 660 potential conditions changes that trigger the recording of data. But this number of potential condition changes may be too many to be effectively stored and analyzed and/or this number of potential condition changes may be unnecessary for some MFCs.

Applicants, however, have found that the response of an MFC over some ranges of operation may be anticipated based upon the response of the MFC at one or more other ranges of operation so that the response in different ranges may be characterized by one data set. For example, when there is a change between two non-zero set points, a new data set for each change need not be created. Based upon experience, Applicants have found that a response of an MFC to transitions between any two ranges will be substantially identical except for the amplitude. For example, a response of the MFC to a set point transition between the first set point bin and the second set point bin should look the same as the response to a set point transition between the first and the tenth set point bin—just the amplitude will be different. So, if the amplitude is scaled, the responses (e.g., delay, rise time, and overshoot) will be very close. As a consequence, instead of having 90 combinations of data sets, one data set corresponding to a transition from one bin to another bin may be created. In other words, by scaling the functional parameter values, the behavior of the MFC may be viably compared for all the non-zero set point to non-zero set point transitions.

With respect to changes from a non-zero set point to a zero set point, instead of ten different combinations from a non-zero set point to zero, just one data set may be created because an MFC is expected to exhibit similar responses if the results are properly scaled. But for transitions between a zero set point and another set point range, these transitions are considered separate condition changes, so there will be at least ten potential data sets for transitions between a zero set point and another non-zero set point range.

So, instead of 110 different combinations of set point transitions, 12 condition changes may be used instead: 1 for the set point changes between non-zero set points; 1 for a change from non-zero set points to a zero set point; and 10 for the zero to non-zero changes in set point.

And because the exemplary combination of ranges in Tables 1 and 2 include 6 different pressure ranges, there are potentially 72 different condition-specific data sets, which is a substantial reduction from the 660 potential condition-specific data sets discussed above.

In addition to set point changes, there may also be changes to pressure while the MFC 100 is set to a constant set point. Because there are 11 different set points (i.e., the zero set point and the 10 set point bins) in connection with 6 different pressures, there may be 66 different condition specific data sets that are associated with pressure changes at a constant set point. Although this approach to reducing data is effective and efficient, it is certainly not required in many embodiments, and it is contemplated that other approaches may be utilized to reduce the different number of condition specific data sets that are utilized. Moreover, it is certainly contemplated that in some instances it is desirable to have more data sets.

Although not required, in some embodiments each MFC 100 is sent to users with baseline data sets. For example, after the device is calibrated in the manufacturing, it can perform several runs at different operating conditions (e.g., the same conditions as calibration conditions) to obtain initial statistical data for some functional parameters, and store these data in the memory as an initial, "baseline," dataset(s).

The same procedure can be performed by a user on a tool (e.g., thin film deposition tool), during the beginning of running a regular process. The user may run a standard process several times to obtain initial statistical data for this specific process. A "baseline" dataset(s) for the specific process can be retrieved from the MFC 100 and stored in the data archive 190 as an expected representation, or "fingerprint," of the process. Although performance of each MFC unit may vary, the general behavior of the MFCs should be close, assuming unit-to-unit repeatability requirements are met. When a new MFC device is installed on the tool, the previously stored "fingerprint" data can be uploaded into the device and used as a "baseline" for this specific tool and process.

As shown in FIG. 2 after the data sets are updated, conditions affecting the functional parameters are monitored (Block 210), and if there are no events that occur (Block 212), the current data sets remain in the short-term data store 175, and the steps associated with Blocks 200-210 are repeated for additional condition changes, and each of the data sets are updated.

Figure 5:
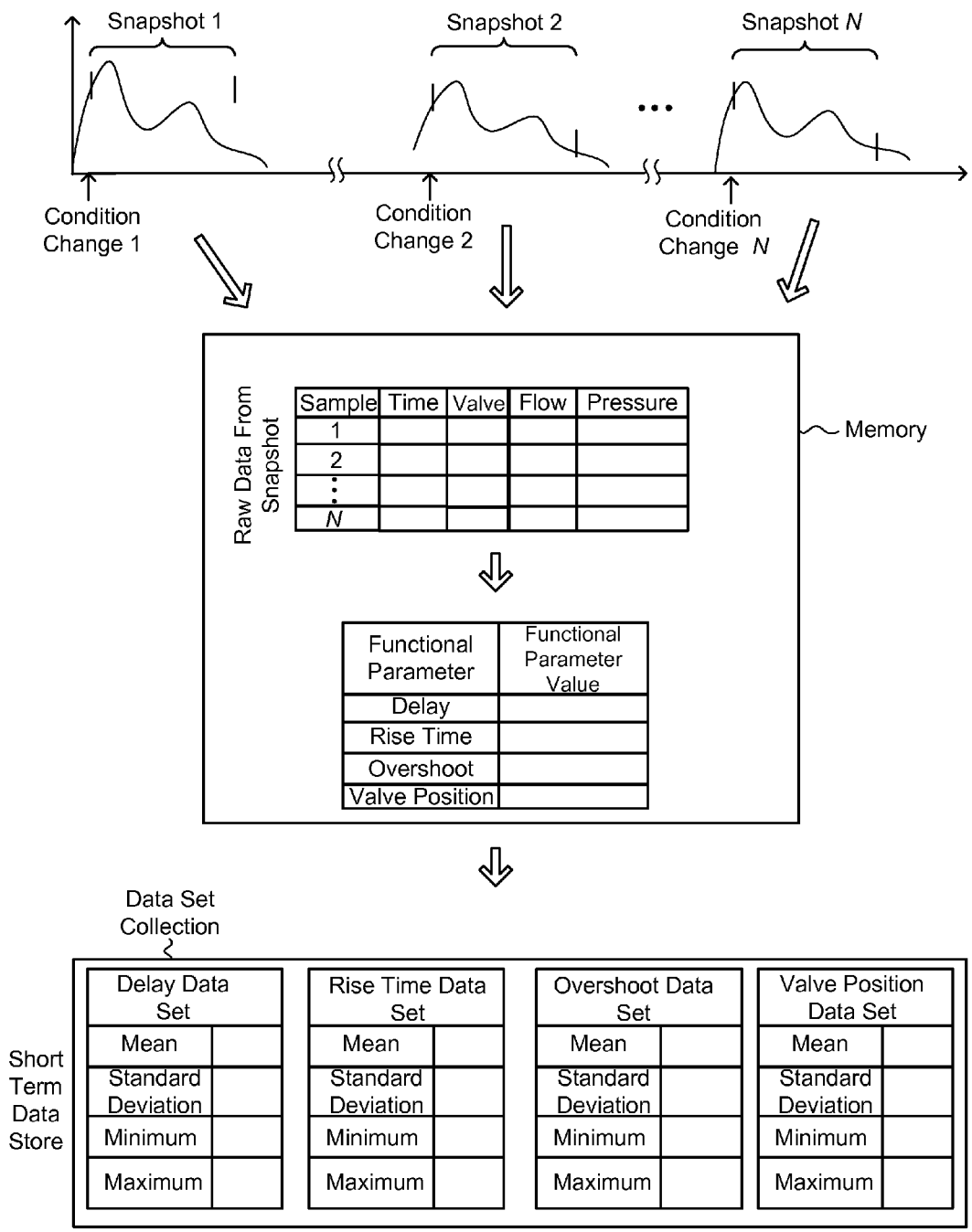
FIG. 5 is a depiction of multiple snapshots that are condensed to a data set collection.

Referring to FIG. 5 for example, shown are a series of N changes to operating conditions that each trigger a snapshot of data that is condensed into functional parameter values that are used to update the data sets in the short-term data store 175 as described with reference to Blocks 200-208 in FIG. 2. For example, the series of N snapshots are snapshots that are serially taken until an event occurs such as a predefined time expiring or a temperature change occurring. As shown, each of the N snapshots include raw data that is condensed to functional parameter values, and the functional parameter values are further condensed into a statistical representation of the functional parameter values that are obtained over the course of the N data snapshots. As shown, after each snapshot, memory of the MFC (e.g., RAM memory) stores the raw data and the generated functional parameter values that are used to update the data sets in the short-term data store 175. When the next snapshot occurs, the raw data from the next snapshot is used to generate new functional parameter values that are again used to update the data sets in the short-term data store 175.

Figure 6:
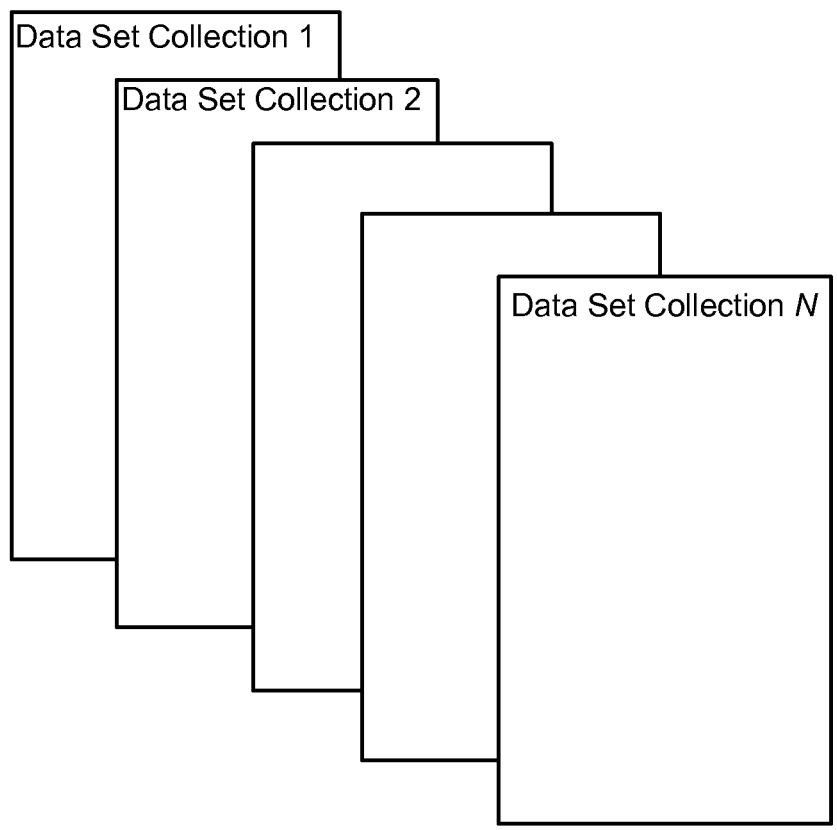
FIG. 6 depicts multiple data set collections that may be used for prognostic operations.

When an event does occur (Block 212), then the current collection of data sets is stored in the long-term data store 180 (Block 214). In many embodiments, either a time period or a change in temperature will trigger the current collection of data sets to be stored in the long-term data store 180. Referring briefly to FIG. 6, shown is a depiction of a plurality of data set collections that are stored in the long-term data store 180. If the event that triggers the current data sets to be stored in the long-term data store 180 is time, the data-logging component 160 may be set to automatically store the current data sets in the long-term data store 180 each day, but other time periods are also contemplated. In addition, if there is a substantial change in temperature, the timer may be overridden so that the current data sets are stored in the long-term data store 180 before the change in temperature affects the parameter values.

On-Board Diagnostics

In accordance with many embodiments, the MFC 100 is configured to utilize the data sets in the short-term data store 175 to determine whether there are any failures in one or more components of the MFC 100. For example, current functional parameters values including response time, overshoot, and stability may be compared against the data sets in the short-term data store 175 to identify any differences that may be indicative of a failure.

On-Board Prognostics

The diagnostic data that is obtained may also be used to predict failures. For example, field history and diagnostic data can be used to determine trends that point to pending failures. Beneficially, several embodiments of the inventive MFC 100 are capable of identifying a failure before it impacts a customer process. For example, if a valve position is trending to increase over time in order to achieve a given flow for a given pressure (e.g., indicating a potential contamination issue), this information may be gathered and reported (e.g., by a flag or an alarm) to prevent the potential contamination issue from progressing to a point where gas begins to be delivered outside of specification.

The data set collections stored in the long-term data store 180 are used for on-board trend analysis. The prognostics may be carried out as a low-priority firmware task that is executed only when the processor does not perform operation-critical tasks. In trend analysis, the current sensor signal and functional parameter statistical data are compared with older data stored in the long-term data store 180. For example, if valve position at 100% steady flow is continuously increasing with time, and is getting close to the specified limit (for instance, 90%), an alarm flag indicating that possible failure may occur in the near future can be set.

Based on the trend analysis, some conclusions about the root cause (e.g., contamination, mechanical defects, a wrong configuration, etc.) of a failure or performance degradation can be made. For example, when there is increasing flow sensitivity to the valve position responsive to a pressure change event, there may be contamination of the bypass 110, which, in turn, results in erroneous flow readings.

Confidence Mode

In some embodiments, the MFC 100 looks at a particular step in recipes and compares it with the previous runs of the same process. For example, the MFC may look at time, pressure fluctuations, stability, and valve position. And in response, the MFC may report a confidence level (e.g., in a percentage) that the same amount of gas was delivered in a subsequent step.

Tool Data Logging and Evaluation

In many instances, the MFC 100 includes the most processing power among any of the devices in a gas box. As a consequence, the MFC 100 may be utilized to determine and report whether a filter needs replacing, and may be utilized to track and report the total quantity of each type gas that was sent through the meter to (e.g., on a date-range basis). In addition, the total gas that has passed through the meter since a last reset may be monitored and reported. Moreover, parameters may be tracked between resets so that any change from a last time the flow was set may be reported. As another example, any occurrences of back flow may be tracked so that the quantity of back flow and time when the back flow occurred may be tracked.

On-Board Tuning

On-board tuning capabilities of the MFC have been described in a number of US Patent Applications, for example: U.S. application publication No. US 20110307104 entitled "Adaptive On-tool Mass Flow Controller Tuning," and U.S. application Ser. No. 13/324,175 entitled "Adaptive Pressure-Insensitive MFC Algorithm for Multi-Gas Application," which are incorporated herein by reference, both teach on-board tuning technologies.

The data logging described herein provides valuable information that can be efficiently used for implementing new on-board tuning algorithms. For example, trend analysis data can be used to improve zero offset temperature compensation.

Figure 7:
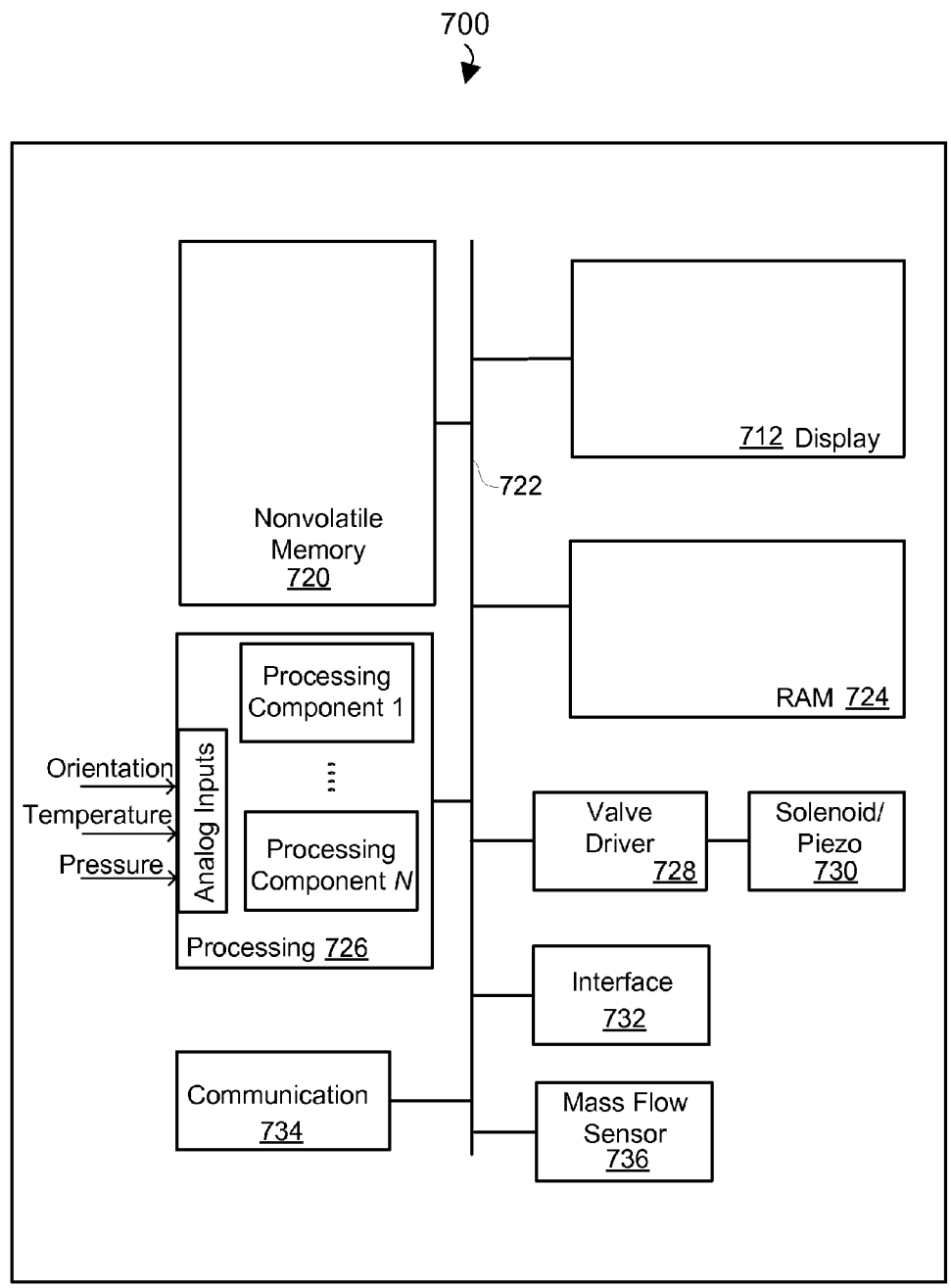
FIG. 7 is a diagram depicting physical components that may be used to realize the mass flow controller depicted in FIG. 1.

Referring next to FIG. 7, shown is a block diagram 700 depicting physical components that may be utilized to realize the MFC 100 described with reference to FIG. 1. As shown, a display portion 712, and nonvolatile memory 720 are coupled to a bus 722 that is also coupled to random access memory ("RAM") 724, a processing portion (which includes N processing components) 726, a valve driver component 728 that is in communication with a solenoid or piezo type valve 730, an interface component 732. Although the components depicted in FIG. 7 represent physical components, FIG. 7 is not intended to be a hardware diagram; thus many of the components depicted in FIG. 7 may be realized by common constructs or distributed among additional physical components. Moreover, it is certainly contemplated that other existing and yet-to-be developed physical components and architectures may be utilized to implement the functional components described with reference to FIG. 7.

This display portion 712 generally operates to provide a presentation of content to a user, and in several implementations, the display is realized by an LCD or OLED display. In general, the nonvolatile memory 720 functions to store (e.g., persistently store) data and executable code including code that is associated with the functional components depicted in FIG. 1. In some embodiments for example, the nonvolatile memory 720 includes bootloader code, software, operating system code, file system code, and code to facilitate the implementation of one or more portions of the components discussed in connection with FIG. 1.

In many implementations, the nonvolatile memory 720 is realized by flash memory (e.g., NAND or ONENAND™ memory), but it is certainly contemplated that other memory types may be utilized as well. Although it may be possible to execute the code from the nonvolatile memory 720, the executable code in the nonvolatile memory 720 is typically loaded into RAM 724 and executed by one or more of the N processing components in the processing portion 726. As shown, the processing component 726 may receive analog temperature and pressure inputs that are utilized by the functions carried out by the control component 140 and the onboard analysis component 156.

The N processing components in connection with RAM 724 generally operate to execute the instructions stored in nonvolatile memory 720 to effectuate the functional components depicted in FIG. 1. For example, the control component 140 may be realized by one or more of the N processing components in connection with non-transitory processor-readable control code that is executed from RAM 724. In addition, the on-board analysis component 156 may be realized by one or more of the N processing components in connection with non-transitory processor-readable control code that is executed from RAM 724 to carry out the method depicted in FIG. 2. And the short-term data store 175 may be realized by RAM 724 and the long-term data store may be realized by the nonvolatile memory 720.

The interface component 732 generally represents one or more components that enable a user to interact with the MFC 100. The interface component 732, for example, may include a keypad, touch screen, and one or more analog or digital controls, and the interface component 732 may be used to translate an input from a user into the set point signal 155. And the communication component 734 generally enables the MFC 100 to communicate with external networks and devices including the external processing tools 185 described with reference to FIG. 1. One of ordinary skill in the art will appreciate that the communication component 734 may include components (e.g., that are integrated or distributed) to enable a variety of wireless (e.g., WiFi) and wired (e.g., Ethernet) communications.

The mass flow sensor 736 depicted in FIG. 7 depicts a collection of components known to those of ordinary skill in the art to realize the mass flow sensor 125 shown in FIG. 1. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will also appreciate that the various illustrative logical blocks, modules, circuits, and algorithm steps described in connection with the embodiments disclosed herein may be implemented by other alternative components than those depicted in FIG. 7. To clearly illustrate this interchangeability of hardware and software, various illustrative components, blocks, modules, circuits, and steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope of the present invention.

More specifically, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor (e.g., as shown in FIG. 7), or in a combination of the two. A software module may reside in non-transitory processor readable mediums such as RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for managing operation of a mass flow controller comprising:

detecting a particular type of change in operating conditions of the mass flow controller, wherein the particular type of change is one of a plurality of different types of potential changes in the operating conditions, the different types of potential changes include a set point change, pressure change, and control loop variable change;

selecting, from among a plurality of different types of available data, condition-specific-data that is a particular one of the different types of available data, the condition-specific-data is selected based upon the particular type of change in the operating conditions that occurs;

initiating, when the particular type of change in the operating conditions is detected, a recording of N samples of the condition-specific-data to obtain a snapshot of operating characteristics of the mass flow controller after the particular type of change in the operating conditions occurs;

determining, based upon the N samples of the condition-specific-data, a functional parameter value for each of a plurality of condition-specific functional parameters that are determined by the particular type of change in the operating conditions, each of at least a portion of the determined condition-specific functional parameter values characterizes operation of the mass flow controller based upon the N samples of the condition-specific data;

creating a plurality of data sets in a first data store a first time the particular type of change in the operating conditions is detected, each of the plurality of data sets includes fields for statistical values for a corresponding one of the condition-specific functional parameters that are associated with the particular type of change in the operating conditions;

updating, each time the particular type of change in the operating conditions is detected, and until a predefined event occurs, the statistical values in each of the data sets that correspond to the condition-specific functional parameters that are determined by the particular type of change in the operating conditions; and performing one or more diagnostic actions based upon current values of the condition-specific functional parameters and the statistical values in the data sets in the first data store.

2. The method of claim 1 including:

saving the data sets in a second data store each time the predefined event occurs to create a collection of data sets that provides a history of statistical values in the data sets over time; and predicting performance of the mass flow controller based upon the history of statistical values in the data sets.

3. The method of claim 1, wherein the condition-specific-data is selected from the group consisting of measured flow, pressure, valve position, flow set point, parasitic flow, corrected flow sensor signal, control loop gain, control loop time constant, flow indicator, and flow indicator time constant.

4. The method of claim 1, wherein the functional parameters are selected from the group consisting of pressure change, ratio of valve position change to pressure change, maximum flow error, flow error at the moment of switching to closed-loop control mode, duration of an open-loop control mode, valve start position, transient delay, transient rise time, transient fall time, overshoot, control time, zero offset, and valve shift at steady flow.

5. The method of claim 1, wherein the statistical values are statistical values selected from the group consisting of a mean value, standard deviation, minimum value, and maximum value.

6. The method of claim 1, wherein the predefined event is selected from the group consisting of a time period, temperature change, gas type change, flow range change, and orientation change.

7. A mass flow controller comprising:

a mass flow control system that includes a mass flow sensor to provide an indication of a mass flow rate of a fluid through the mass flow controller, a control valve to regulate a flow of the fluid, and a control component to control a position of the control valve responsive to a set point and the indication of the mass flow rate of the fluid;

a first data store;

a data logging component that detects particular types of changes in operating conditions of the mass flow controller, selects condition-specific-data that is selected from among a plurality of alternative different types of available data; and obtains, for each particular type of change in operating conditions, a snapshot of condition-specific-data after each occurrence of each one of the particular types of changes in the operating conditions, and generates functional parameter values that characterize operation of the mass flow controller based upon each snapshot of condition-specific-data, and the data logging component generates statistical values that are stored in the first data store that characterize multiple functional parameter values that are each obtained after each separate occurrence of each one of the particular types of changes in the operating conditions; and a diagnostics component that diagnoses failures using current functional parameter values and the statistical values stored in the first data store.

8. The mass flow controller of claim 7, including a second data store, wherein the data logging component stores each of a collection of data sets that include the statistical values in the second data store responsive to a predefined event that affects the functional parameter values; and a prognostics component that predicts failures based upon the collection of data sets in the second data store.

9. The mass flow controller of claim 8, wherein the predefined event is selected from the group consisting of a time period, temperature change, gas type change, flow range change, and orientation change.

10. The mass flow controller of claim 7, wherein the condition-specific-data is selected from the group consisting of measured flow, pressure, valve position, flow set point, parasitic flow, corrected flow sensor signal, control loop gain, control loop time constant, flow indicator, and flow indicator time constant.

11. The mass flow controller of claim 7, wherein the functional parameters are selected from the group consisting of pressure change, ratio of valve position change to pressure change, maximum flow error, flow error at the moment of switching to closed-loop control mode, duration of an open-loop control mode, valve start position, transient delay, transient rise time, transient fall time, overshoot, control time, zero offset, and valve shift at steady flow.

12. The mass flow controller of claim 7, wherein the statistical values are statistical value selected from the group consisting of a mean value, standard deviation, minimum value, and maximum value.

* * * * *